United States Patent [19]

Fitzgerald

[11] Patent Number: 4,754,927
[45] Date of Patent: Jul. 5, 1988

[54] CONTROL VANES FOR THRUST VECTOR CONTROL NOZZLE

[75] Inventor: Robert E. Fitzgerald, New Britain, Conn.

[73] Assignee: Colt Industries Inc., New York, N.Y.

[21] Appl. No.: 939,197

[22] Filed: Dec. 8, 1986

[51] Int. Cl.[4] .................................. B63H 25/46
[52] U.S. Cl. .................. 239/265.17; 239/265.23; 244/3.22; 244/52
[58] Field of Search ............... 239/265.17, 265.23; 244/52, 3.22; 60/242, 271, 231

[56] References Cited

U.S. PATENT DOCUMENTS

| | | | |
|---|---|---|---|
| 2,763,125 | 9/1956 | Kadosch et al. | 239/265.23 |
| 2,791,088 | 5/1957 | Rao | 239/265.23 |
| 2,812,636 | 11/1957 | Kadosch et al. | 239/265.17 |
| 2,875,578 | 3/1959 | Kadosch et al. | 239/265.17 |
| 3,606,165 | 9/1971 | Dunaway | 239/265.17 |
| 3,995,662 | 12/1976 | Fitzgerald et al. | 137/825 |
| 4,077,572 | 3/1978 | Fitzgerald | 239/265.17 |
| 4,351,479 | 9/1982 | Kranz et al. | 239/265.23 |

OTHER PUBLICATIONS

R. E. Fitzgerald and R. F. Kampe, "Boundary Layer TVC for Missile Applications," AIAA/SAE/ASME 19th Joint Propulsion Conference, 1983, AIAA-8-3-1153.

Primary Examiner—Andres Kashnikow
Assistant Examiner—Michael J. Forman
Attorney, Agent, or Firm—Richard A. Dornon; Howard S. Reiter

[57] ABSTRACT

A boundary layer thrust vector control nozzle (10) has a housing (18), the aft end of which has attached a control vane assembly (12). The control vane assembly includes two brackets (78, 80) which receive two vanes (86, 88) such that the vanes are in spaced parallel relationship and extend across the exhaust opening. The vanes have equal but opposite angles of attack and are adapted to generate large side forces in a perpendicular plane and small side forces in a plane parallel to the vanes. The nozzle includes four sets of control ports (44, 46) for deflecting an exhaust plume to produce the large and small side forces also to produce significant roll moments.

3 Claims, 3 Drawing Sheets

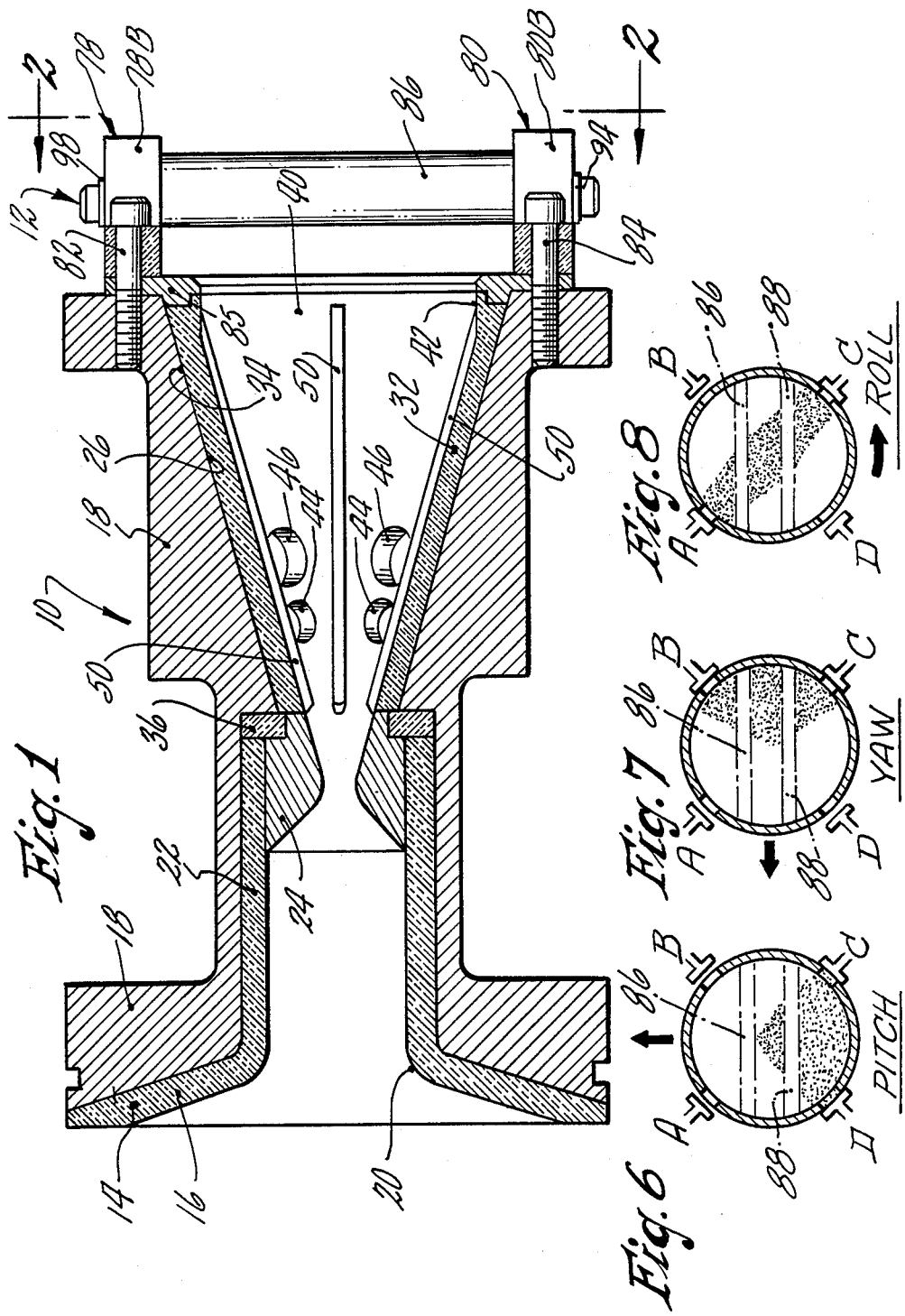

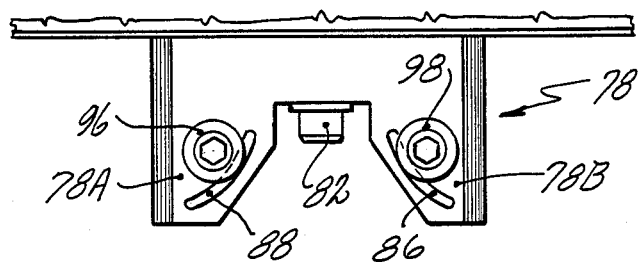
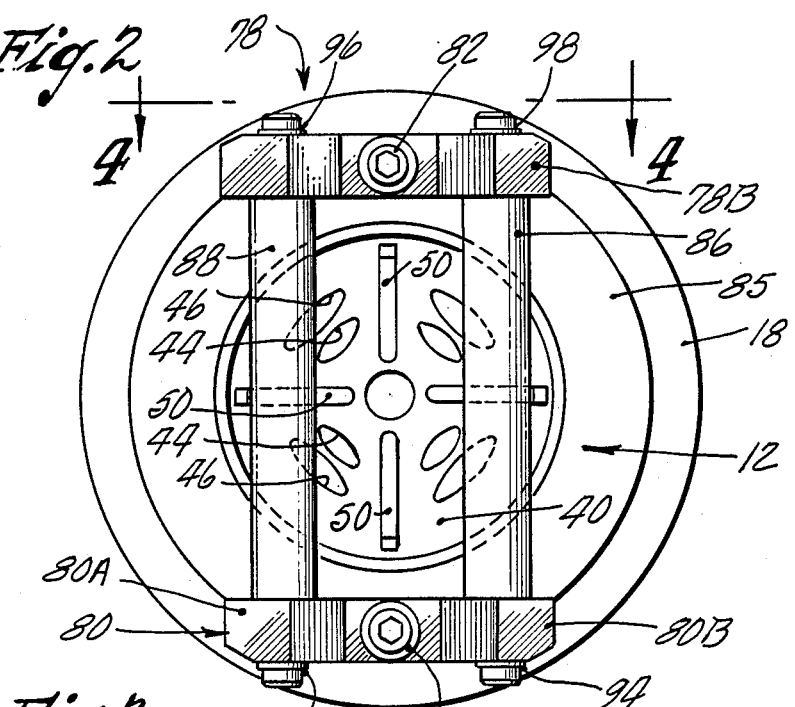
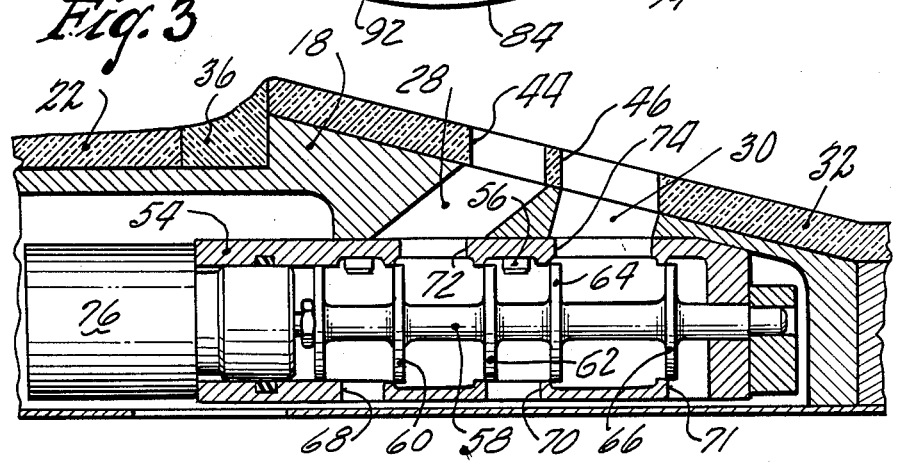

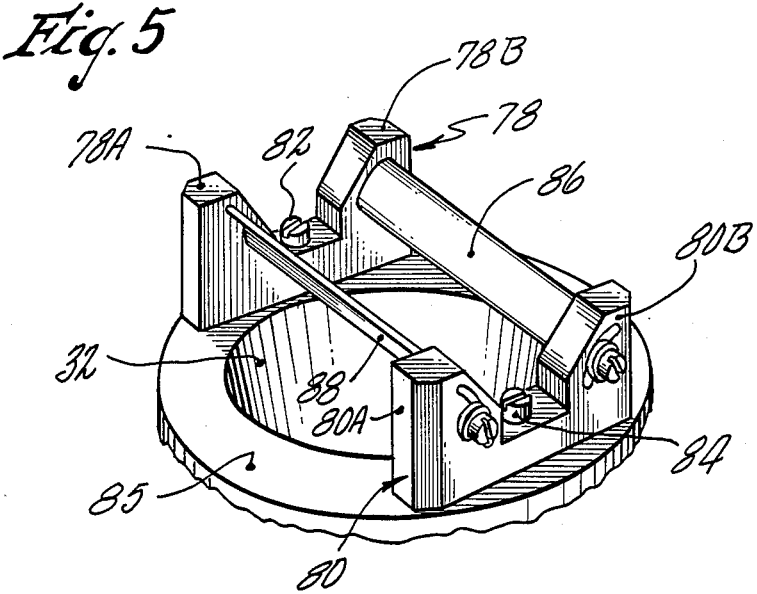

CONTROL VANES FOR THRUST VECTOR CONTROL NOZZLE

TECHNICAL FIELD

This invention relates to boundary layer thrust vector control nozzles.

DISCLOSURE OF INVENTION

In the past, roll control for boundary layer thrust vector control (BLTVC) nozzles has been furnished ither by specially configured strakes in the deflection section, which are primarily utilized to prevent circumferential flow, or by installing small airfoils or control vanes near the exit of the nozzle. An example the former technique is shown in U.S. Pat. No. 3,995,662 and an example of the latter method is peresented in a paper by R. E. Fitzgerald and R. F. Kampe entitled "Boundary Layer TVC For Missile Applications," AIAA-83-1153, 1983. In addition, the arrangement of the aforementioned paper provides a means whereby the side forces (pitch and yaw forces) produced may be made greater than those forces available without control vanes. In both of the aforementioned control schemes, the roll and/or side forces producible may not be of a magnitude sufficient for missile control in certain applications.

DISCLOSURE OF THE INVENTION

The invention provides a control vane arrangement for a BLTVC nozzle which enhances missile controlability because it has the inherent capability of generating relatively large roll and side forces. In addition, an arrangement of the invention allows much greater side forces to be generated in one plane than in another plane orthoginal thereto, thereby rendering an arrangement of the invention exceedingly suitable for missile steering applications which mandate more pitch force than yaw force or vice versa.

In accordance with one form of invention, at least two generally parallel control vanes are mounted on the exit of a BLTVC nozzle such that they extend thereacross. All that is needed for mounting the control vanes are two simple mounting brackets placed adjacent the nozzle exit. The control vanes are mounted such that they have equal but opposite angles of attack whereby roll moments of either sense can be generated in addition to generation of a large side force (e.g., a pitch force).

Accordingly, it is a primary object of the invention to provide control vanes for a BLTVC nozzle which are capable of providing relatively large roll moments.

Another object of the invention is to provide control vanes for BLTVC nozzle which are capable of generating a large side force in one plane.

These and other objects and advantages of the invention will become more readily apparent form the following detailed description, when taken in conjunction with the accompanying drawings, in which:

BRIEF DESCRIPTION OF DRAWINGS

FIG. 1 is a longitudinal sectional view of a nozzle arrangement according to the invention.

FIG. 2 is a rear elevational view of the nozzle of FIG. 1, taken substantially along the line 2—2 of FIG. 1.

FIG. 3 is a schematic view of a valve for admitting atmospheric air to one set of control ports.

FIG. 4 is a fragmentary top plan view of the nozzle of FIGS. 1 and 2, taken substantially along the line 4—4 of FIG. 2.

FIG. 5 is a fragmentary perspective view of the aft end of the nozzle of FIG. 1.

FIGS. 6, 7 and 8 are highly schematic views of the aft end of the nozzle of FIG. 1, showing the generation of a large pitch force, a small yaw force and a large roll moment, respectively.

BEST MODE OF CARRYING OUT THE INVENTION

Shown in FIG. 1 is a BLTVC nozzle 10 having a control vane assembly of the invention, generally shown at 12. The nozzle 10 is adapted to be mounted in the aft end of a flight vehicle, such as a missile. It will be noted that nozzle 10 is three dimensional in design and defines an interior surface of revolution having a longitudinal nozzle axis.

A combustion chamber (not shown), which serves as a source of propulsive gas under pressure, communicates with a converging approach nozzle 14. The approach nozzle 14, which may be of a plastic material such as silica phenolic, is mounted upon the forward conical face 16 of an aluminum nozzle housing 18 by suitable cement. The exit opening 20 of the nozzle 10 is in communication with a cylindrical blast tube 22 similarly cemented to the housing 18 and made of silica phenolic. The rear of the blast tube 22 is provided with a converging-diverging throat insert 24 of tungsten infiltrated by copper. The forward portion of the nozzle, thus far described, consists essentially of an approach nozzle, a blast tube and a throat section.

The rear section of the nozzle of FIG. 1 may be regarded as a plume or jet exhaust stream deflection section wherein the plume is selectively directed to provide the desired thrust vector control. The housing 18 has a conical wall 26 which diverges in the direction of the rear of the nozzle and an annular flange whose periphery engages the aft fairing (not shown) of the missile. A volume is defined between the missile fairing (not shown) and the exterior of the housing 18 which volume functions as a source of ambient air for control purposes. The rear section of the nozzle is preferably furnished with four sets of control ports, as is apparent from FIG. 2. Two sets of control conduits 28 and 30 (FIG. 3) are diametrically opposed and the other two sets of control conduits are also diametrically opposed in orthoginal relationship to the first mentioned sets. Thus, it will be appreciated that each set of adjacent control conduits 28 and 30 is spaced ninety degrees from the adjacent sets.

With reference to FIGS. 1 and 2, within the rear section of the nozzle, an insulator cone 32 of silica phenolic is secured by a suitable cement disposed between the outer surface 34 of the cone 32 and the conical nozzle wall 26. The apex of the cone 32 is truncated and bears against the rear face of a spacer 36 and the throat insert 24 such that its inner surface merges smoothly and is flush with the adjacent inner surface 38 of the throat insert 24, whereby a continuous nozzle wall is formed. The conical interior wall surface 40 of the insulator cone undergoes an abrupt transition adjacent its base at the aft end of the nozzle to a cylindrical surface 42 to seal the boundary layer and prevent axial inflow as is customary in BLTVC nozzles.

The insulator cone 32 embodies four sets of control ports 44 and 46 which are spaced ninety degrees apart in the manner of the control conduits. Each set of control conduits 28 and 30 confronts a set of control ports 44 and 46 such that conduit 28 and port 44 are in registering relationship and conduit 30 and port 46 are also in registering relationship, as is clearly shown in FIG. 9. The underlying rationale for having two longitudinally aligned control ports instead of one control port is that plume deflection control is available for a greater range of pressure ratios (the ratio of the pressure in the combustion chamber to that in the deflection section).

The insulator cone 32 incorporates four longitudinally extending strakes or ribs 50 which, for example, could be made of tungsten infiltrated with copper. The strakes 50 each lie equidistant from adjacent sets of control ports and prevent circumferential flow from disrupting the low pressure pocket formed between the plume and the insulator cone when a set or sets of control ports is closed and also produce shock waves from their leading edges which triggers the separation proces that induces deflection of the plume.

In order to admit atmospheric air to each set of control conduits 28 and 30, four valves, one of which is generally shown at 52, are mounted in the housing 18. Each of the valves 52 has a valve housing 54 which is secured to the nozzle housing 18 by means of screws 56 and in which a spool 58 is disposed for axial sliding movement. Spool 58 has four lands 60, 62, 64, and 66 which control the flow of air from inlets 68 and 70 and 71 to outlets 72 and 74. Outlets 72 and 74 respectively communicate with control conduits 28 and 30. A solenod 76 is actuated to displace spool 58 rearwardly whereby atmospheric air may proceed from the valve inlets to the valve outlets and thence to the control ports 44 and 46 via the control conduits 28 and 30, respectively.

In operation, when one of the sets of control ports 44 and 46 is closed by moving the associated valve spool 58 to the left or toward the front of the nozzle, atmospheric air no longer communicates with that particular set of control ports, thereby causing the plume to become unstable and be diverted from its normal axial flow path so as to attach to that portion of the wall surface 40 of the insulator cone 32 in alignment with and in the area of the closed set of control ports. Conversely, reopening the closed control ports results in the plume deflecting to its normal axial flow position. The surface area of plume attachment to wall surface 40 is dependent upon whether one set of ports, two sets of ports or three sets of ports are simultaneously closed. BLTVC operation is, of course, possible by simultaneously closing of one set of ports, two sets of ports or three sets of ports with the latter two methods being generally accepted modes of operation. For a more complete discussion of the theory of operation and control of TVC nozzles reference should be had to the U.S. Pat. Nos. 3,995,662 and 4,077,572.

Neglecting the control vane assembly 12 for the moment, it will be appreciated that side forces can be generated by deflection of the plume in a selected direction. However, these side forces may not be of a requisite magnitude to properly control a flight vehicle. To this end, the control vane assembly 12 allows large side forces to be generated in one plane in addition to permitting the generation of significant roll forces. Installation of assembly 12 is exceedingly simple as it does not mandate special internal nozzle modifications but is merely attached to the aft end of the nozzle.

Control vane assembly 12 is shown in FIGS. 1,2,4 and 5. Assembly 12 comprises two channel-shaped vane mounting brackets 78 and 80 of identical construction connected to the aft end of the nozzle housing 18 by screws 82 and 84, respectively, which extend through a cone locator retainer 85. The mounting brackets straddle the exit opening of the nozzle 10 in parallel spaced relationship. The brackets 78 and 80 include legs 78A, 78B and 80A, 80B, respectively, having curved slots therein for receiving the end of a control vane. A control vane 86 has its ends received within the slots in legs 78B and 80B while control vane 88 has its ends received within the slots in legs 78A and 80A. The control vanes are retained in position by means of washers 92,94, 96 and 98.

The vanes 86 and 88 which are identical and of airfoil shape (and preferably made of molybdinum to withstand high temperatures) are mounted in the brackets such that they have equal but opposite angles of attack to an axially aligned exhaust stream plume. This is apparent from FIG. 4. As can be readily observed from FIGS. 2 and 5, the vanes 86 and 88 are in spaced parallel relationship and equidistant from the nozzle axis with their spanwise axes parallel. In addition, FIG. 2 reveals that the vanes are parallel to a plane containing the axes of two oppositely disposed strakes, whereby roll moments may be engendered by closing two opposite sets of ports and different side forces may be produced by closing two adjacent sets of ports. As shown in FIG. 2, the vanes 86 and 88 lie slightly within the projected boundary of the nozzle exit opening and closely adjacent its aft end, whereby large forces may be produced. However, it will be understood that the optimum location of the vanes should be determined by experimentation.

FIGS. 6-8 illustrate the nature of the forces generated by a control vane assembly of the invention. To facilitate explanation of the benefits to be derived from the invention, the sets of control ports have been merely designated by the letters A,B, C and D. In FIG. 6, control port sets A and B are open and control Port sets C and D are closed, thereby causing a downward deflection of the plume in a first radial direction (the shape of which is shown by a dot pattern). Since the downwardly deflected plume traverses vane 88, a large upward side force is beget which produces a significant pitching moment abut the the missiles lateral axis. This is , of course, due to the pressure on inboard vane surface being lower than that on the outboard vane surface. However, closing port sets B and C and opening port sets A and D causes a right lateral deflection of the plume in a third radial direction perpendicular to the first radial direction such that the resultant pressure forces acting on the vanes 86 and 88 cancel one another, thereby producing a lateral side force of lesser magnitude than the previously discussed upward force. This reduced side force produces a yawing moment about the missiles vertical axis which is much less than the aforementioned pitching moment. FIG. 8 shows a counterclockwise rolling moment being generated by an elongated exhaust plume occasioned by the closure of port sets A and C and the opening of port sets B and D, the plume extending into two opposite quadrants. In this latter case, the resultant pressure force on vane 86 is downwardly directed and the resultant pressure force on vane 88 is upwardly directed but laterally offset therefrom whereby a large counterclockwise rolling moment is produced around the missile's longitudinal axis. It should be readily apparent that closing port sets A and B (instead of D and C) will produce a plume deflection in a second radial direction opposite to the first radial direction and a consequential downward pitch force and that closing port sets A and D (instead of B and C) will produce a plume deflection in a fourth radial direction opposite to the third radial direction and a consequential rightward yaw force. In like manner, closing port sets B and D will produce a clockwise rolling moment because of the elongated exhaust plume extending into the other two opposite quadrants. With all port sets open, the plume will be axially directed and pass between the vanes 86 and 88 without making contact therewith.

Obviously many variations and modifications are possible in light of the above teachings without departing form the scope or spirit of the invention as defined in the appended claims. For example, it is important to note that a control vane assembly of the invention need not have vanes that extend completely across the nozzle opening but that a mid portion of each vane could be removed. In this regard, the invention could be practiced with four vanes as illustrated in the aforementioned paper with appropriate changes in alignment such that the laterally opposed vanes have a common axis.

I claim:

1. In an improved thrust vector control nozzle arrangement of type having: a nozzle housing having a longitudinal nozzle axis and with a throat section; a deflection section connected to the downstream end of the throat section with a divergent interior wall and an aft end with a circular nozzle exhaust opening; means to cause a jet exhaust plume to emanate from the aft end of the nozzle housing; and control ports in the deflection section to selectively deflect the plume in a first radial direction, in a second radial direction opposite to that of the first radial direction, in a third radial direction generally perpendicular to the first and second radial directions, in a fourth radial direction opposite to that of the third radial direction and to selectively produce an elongated exhaust plume extending either into the two quadrants defined between the first and fourth radial directions and the third and second radial directions or into the two quadrants defined between the first and third radial directions and the second and fourth radial directions, the improvement comprising:

first vane means defining a first spanwise vane axis extending across the exhaust opening to produce a first resultant force perpendicular to the first vane axis when enveloped by a plume deflected in the first direction;

second vane means defining a second spanwise vane axis parallel to and the spaced from the first vane axis and extending across the exhaust opening to produce a second resultant force opposite to the first resultant force and perpendicular to the second vane axis when enveloped by a plume deflected in the second direction; and the first and second vane means producing opposing resultant forces perpendicular to their respective first and second vane axes when the plume is deflected in either the third direction or the fourth direction; and the first and second vane means producing offset resultant forces perpendicular to their respective first and second vane axes when the plume extends either into the first mentioned two quadrants or into the second mentioned two quadrants.

2. The improvement of claim 1 wherein the first vane means comprises:

a first vane extending across the exhaust opening; and whrein the second vane means comprises:

a second vane extending across the exhaust opening spaced from and parallel to the first vane; and wherein the vanes have equal but opposite angles of attack with reference to an exhaust plume coaxial with the nozzle axis.

3. The improvement of claim 2, further comprising:

a pair of mounting brackets connected to the aft end of the nozzle housing, the first vane being received within both of the brackets and the second vane being received within both of the brackets.

* * * * *